(12) United States Patent
Johnston et al.

(10) Patent No.: US 7,276,214 B2
(45) Date of Patent: Oct. 2, 2007

(54) CHEMICAL REACTOR

(75) Inventors: Anthony Matthew Johnston, Double Bay (AU); Brian Scott Haynes, Frenchs Forest (AU)

(73) Assignee: Meggit (UK) Ltd., Dorset (GB)

( * ) Notice: Subject to any disclaimer, the term of this patent is extended or adjusted under 35 U.S.C. 154(b) by 283 days.

(21) Appl. No.: 10/500,176

(22) PCT Filed: Jan. 3, 2003

(86) PCT No.: PCT/AU03/00022
§ 371 (c)(1),
(2), (4) Date: Jan. 10, 2005

(87) PCT Pub. No.: WO03/055585
PCT Pub. Date: Jul. 10, 2003

(65) Prior Publication Data
US 2005/0138864 A1    Jun. 30, 2005

(30) Foreign Application Priority Data
Jan. 4, 2002    (AU) ..................................... PR9817

(51) Int. Cl.
*B01J 8/02* (2006.01)
(52) U.S. Cl. ...................... 422/211; 422/198; 422/222; 48/127.7; 48/127.9; 48/198.2; 48/198.8
(58) Field of Classification Search ...................... None
See application file for complete search history.

(56) References Cited
U.S. PATENT DOCUMENTS
2002/0071797 A1 *   6/2002   Loffler et al. ................ 422/190

FOREIGN PATENT DOCUMENTS

| EP | 0 430 184 B1 | 9/1993 |
|---|---|---|
| WO | 01/54806 A1 | 8/2001 |
| WO | 02/28769 A2 | 4/2002 |

* cited by examiner

*Primary Examiner*—Glenn Caldarola
*Assistant Examiner*—Vinit H. Patel
(74) *Attorney, Agent, or Firm*—Merchant & Gould P.C.

(57) ABSTRACT

A chemical reactor is disclosed and which has a core composed of a stack of metal plates that are diffusion bonded in face-to-face relationship. A plurality of reaction zones are located within the core, as are a plurality of catalyst receiving zones, and both the reaction zones and the catalyst receiving zones are defined by respective aligned apertures in the plates.

A first channel arrangement is provided in some of the plates for transporting a first reactant to and between the reaction zones, portions of the first channel arrangement that interconnect the reaction zones being formed over at least a portion of their length as heat exchange channels.

A second channel arrangement is provided in others of the plates and is arranged to deliver a second reactant to each of the reaction zones. Also, a third channel arrangement provided in still others of the plates for transporting a third reactant to and between the catalyst receiving zones, portions of the third channel arrangement that interconnect the catalyst receiving zones being formed over at least a portion of their length as heat exchange channels that are positioned in heat exchange proximity to the heat exchange channels of the first channel arrangement.

Also disclosed is a fuel processor that incorporates the chemical reactor, the catalyst receiving zones being arranged to function as reformer stages in the fuel processor.

18 Claims, 9 Drawing Sheets

CHEMICAL REACTOR

FIELD OF THE INVENTION

This invention in broad terms relates to an apparatus for use in, and a method of, effecting a chemical reaction. The invention has been developed in relation to a steam methane reformer for use in association with a proton exchange membrane fuel cell and the invention is herein described in that context. However it will be understood that both the apparatus and the method of the invention do have broader applications, to other reactive processes.

BACKGROUND OF THE INVENTION

Reforming processes are conventionally effected in tubular reformers, with catalyst packed into a plurality of reactor tubes. Heat is applied directly to and transferred through the walls of the tubes in a manner to maintain radial and axial temperature profiles inside the tubes within required limits, and this approach has been more-or-less successful. However, it does require the establishment of a fine balance between reaction and heat transfer within the tubes, heat transfer to the outside of the tubes and pressure drop.

The establishment of this balance and the consequential need for relatively large catalyst particles result in low catalyst effectiveness and the need for reformers that are inherently bulky. The catalyst effectiveness might be enhanced and the size of the reformers might be reduced if smaller catalyst particles having higher activity were to be used, but pressure-drop constraints would then dictate the use of many, parallel, short tubes in the reformers.

Some consideration has been given to the possible development of an alternative to the tubular reformers; that is, to the use of so-called printed circuit heat exchanger ("PCHE") cores and to the deposition of thin layers of reforming catalyst into channels of plates that form the cores. The PCHE cores currently are used in heat exchangers, and they are constructed by etching channels having required forms and profiles into one surface of individual plates which are then stacked and diffusion bonded to form cores having dimensions required for specific applications.

However, whilst this alternative (projected) approach does indicate some merit, several problems are foreseen, including the following:

Difficulties in obtaining adhesion of catalyst to the metal (plate) substrate,
Limited catalyst life,
Difficulties in replacing the catalyst, and
Coupling of heat transfer and catalyst areas, this requiring very high-activity catalyst if over-investment in heat exchange surface is to be avoided.

A partial solution to these problems is revealed in United States Patent Publication US2002/0018739 A1, dated 14 Feb. 2002, which (without constituting common general knowledge) discloses a chemical reactor having a PCHE-type core. The core is constructed with alternating heat exchange and catalyst-containing zones that together form a passageway for a reactant. Each of the heat exchange zones is formed from stacked diffusion bonded plates, with some of the plates providing channels for (externally heated or cooled) heat exchange fluid and others of the plates providing orthogonally directed channels to carry the reactant from one catalyst-containing zone to the next such zone.

The present invention in one of its applications is directed to a development which alleviates at least some of the problems of tubular reformers and which facilitates or extends, in a novel way, the use of PCHE cores in chemical reactors.

SUMMARY OF THE INVENTION

The present invention may be defined broadly as providing a chemical reactor comprising:

a) a core composed of at least one stack of metal plates bonded in face-to-face relationship,
b) a plurality of reaction zones located within the core,
c) a plurality of catalyst receiving zones located within the core,
d) a first channel arrangement provided in at least some of the plates for transporting a first reactant to and between the reaction zones, portions of the first channel arrangement that interconnect the reaction zones being formed over at least a portion of their length as heat exchange channels,
e) a second channel arrangement provided in at least some of the plates and arranged to deliver a second reactant to each of the reaction zones, and
f) a third channel arrangement provided in at least some of the plates for transporting a third reactant to and between the catalyst receiving zones, portions of the third channel arrangement that interconnect the catalyst receiving zones being formed over at least a portion of their length as heat exchange channels that are positioned in heat exchange proximity to the heat exchange channels of the first channel arrangement.

The invention may also be defined in broad terms as providing a method of effecting a chemical reaction by:

directing a first reactant into and serially through the reaction zones in the above defined reactor by way of the first channel arrangement,
directing a second reactant in parallel feeds into the reaction zones by way of the second channel arrangement, the second reactant being selected to react exothermically with the first reactant in the respective reaction zones, and
concurrently directing a third reactant into and serially through a catalyst contained in the catalyst receiving zones by way of the third channel arrangement and, in so doing, exposing the reactant to heat from the product of the exothermic reaction in its passage through the heat exchange channels of the first channel arrangement.

Depending upon the process, the reaction zones may also be charged with a catalyst that is selected to provide for catalytic reaction (e.g., combustion) of the first and second reactants.

OPTIONAL FEATURES OF THE INVENTION

The core of the above defined reactor may be constructed from plural stacks of the metal plates and, in such a case, the adjacent stacks may be spaced apart by interconnecting walls that define the reaction zones and the catalyst receiving zones. Such an arrangement is considered to be especially suitable for large capacity reactors.

However, for at least some reactors, the core may comprise a single stack of metal plates. In this case each of the reaction zones will be defined by aligned apertures in adjacent ones of the plates and each of the catalyst receiving zones will similarly be defined by (further) aligned apertures in adjacent ones of the plates.

The number of reaction zones within the core may be the same as or different from the number of catalyst receiving zones. In a specific embodiment of the invention the reaction zones are arrayed in two parallel rows, with the first channel arrangement extending linearly between the reaction zones. Also, in this case, the catalyst receiving zones may be arrayed in three parallel rows, one of which is located between of the rows of reaction zones and the other two of which are located outside of the rows of reaction zones.

For some applications of the invention the metal plates may be stacked in repeating groups of three superimposed plates, with one of the three plates being formed with the first channel arrangement for transporting the first reactant to and between the reaction zones, a second of the three plates being formed with the second channel arrangement for delivering the second reactant to the reaction zones and the third plate of each group being formed with the third channel arrangement for transporting the third reactant through the catalyst receiving zones.

In order to optimize heat transfer between the product of the exothermic reaction and the third reactant, the first and third plates may be diffusion bonded in face-to-face contacting relationship.

In other applications of the invention, for example when the reactor embodies or is constructed as a reformer, it may be necessary or desirable to exchange heat between portions of the (same) reactant stream that are at different processing stages. Also, it may be desirable in some cases to allocate a single processing function to two or more plates and/or to increase the number of plates for the purpose of optimizing heat exchange. In such cases it will be necessary to stack the plates in repeating groups of four or more plates. The order in which the plates of each group will be interleaved and diffusion bonded will be dependent upon the requirements of specific processes and channel formats embodied in the plates.

Embodiments of the invention have applications in any process that requires catalytic conversion of a reactant and heating of the reactant between catalytic reaction stages. However, in a specific embodiment of the invention the reactor comprises or incorporates a reformer such as a steam methane reformer for use in association with a proton exchange membrane fuel cell or other application requiring hydrogen or syngas. In such case the reactor may be incorporated in a fuel processor that may include at least one pre-reformer that is arranged to be heated by hot syngas, at least one pre-reformer that is arranged to be heated by hot flue gas and, as portions of the reactor, multiple reformers arranged to be heated indirectly by catalytic combustion of, for example, anode off-gas. In this arrangement the first reactant may comprise a combustion supporting gas and the second reactant may comprise a combustible gas such as anode off-gas.

The fuel processor, of which the reactor may be a part, may also incorporate ancillary processing stages, including cooling and pre-heating stages, water-gas shifting and CO oxidation. Some or all of these stages may be incorporated in a further core (or further cores) that is (or are) similar to the reactor core, the further core(s) having appropriate channel arrangements in stacked metal plates.

The invention will be more fully understood from the following description of a specific embodiment of a reactor in the form of a steam methane reformer that is incorporated in a fuel processor. The description is provided with reference to the accompanying drawings.

DETAILED DESCRIPTION OF PREFERRED EMBODIMENT

Figure 1:
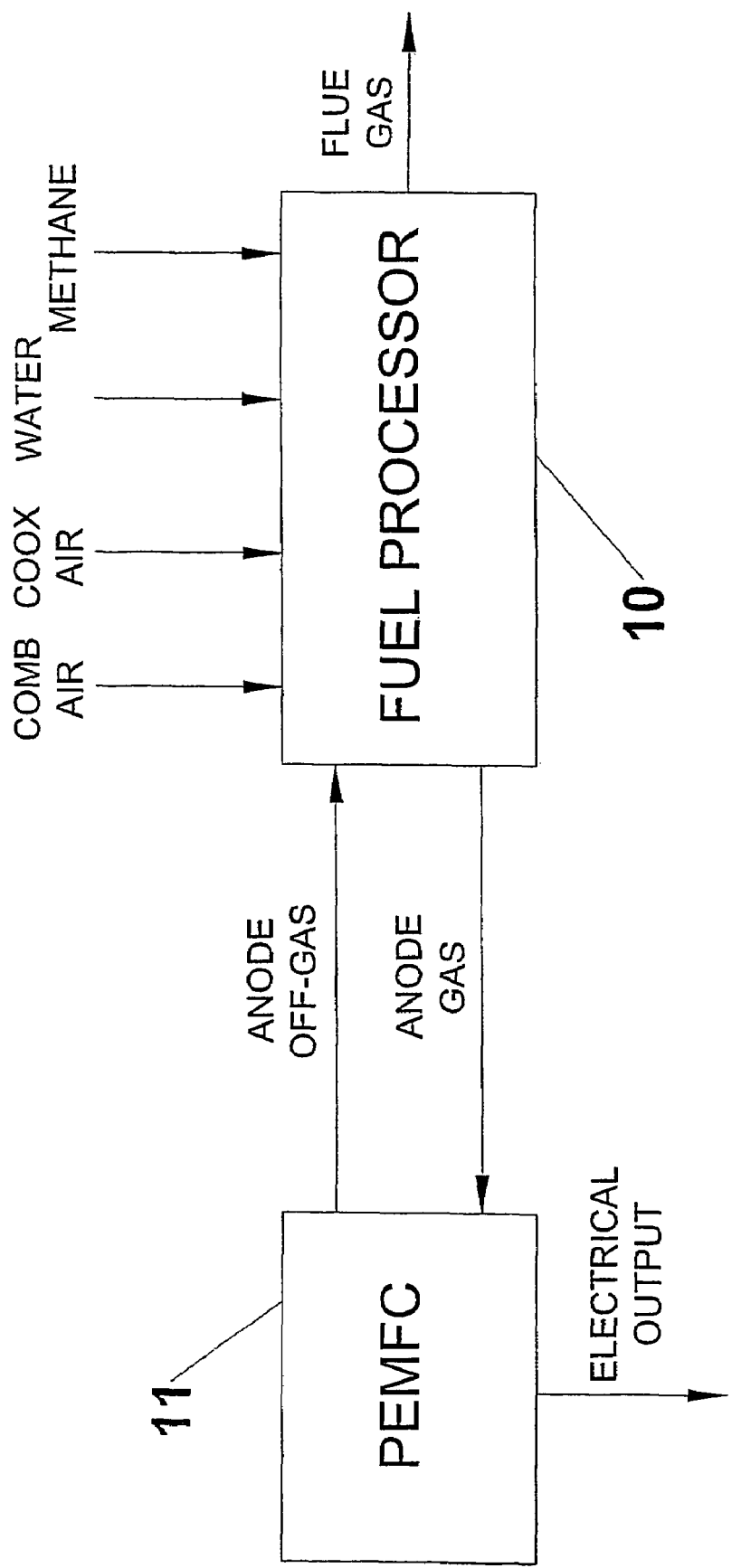
FIG. 1 shows a diagrammatic representation of the fuel processor connected to an associated proton exchange membrane fuel cell ("PEMFC")
Figure 2:
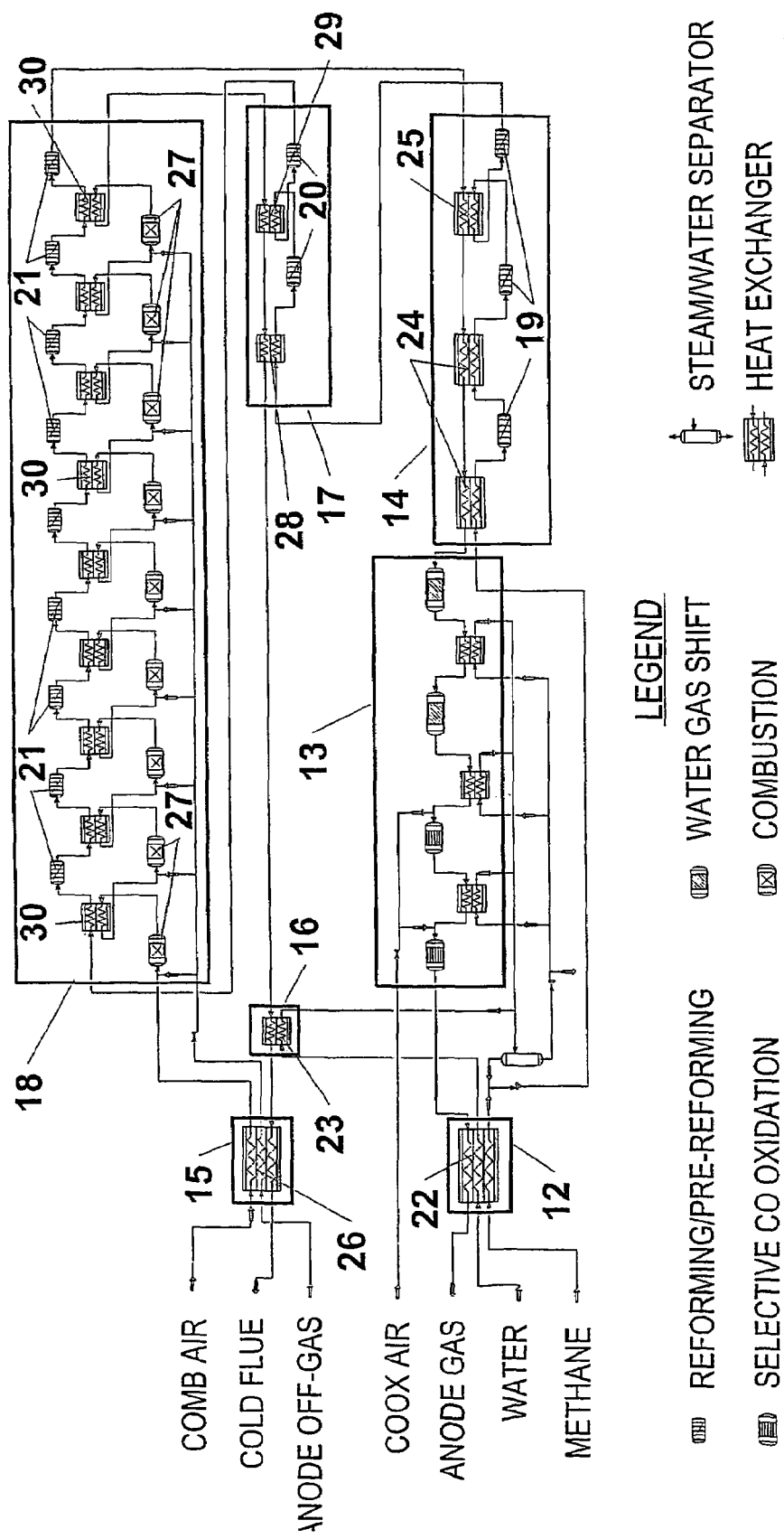
FIG. 2 shows a diagrammatic representation of the fuel processor shown in FIG. 1, including a reactor having reforming and pre-reforming stages.

As shown in FIGS. 1 and 2, the fuel processor 10 is in use connected to a PEMFC 11, and pipework indicated by the arrowed connections is provided to deliver the various indicated fluids (this term embracing both liquids and gases in this specification) to and from the fuel processor. The fuel processor 10 is shown in block-diagrammatic form in FIG. 2 but, as will be described later, portions of the fuel processor are embodied in a single core that is composed of diffusion bonded plates.

The fuel processor 10 may be considered as including seven notionally separate portions or modules 12 to 18 that provide the following functionality:

12—Anode gas cooling. Methane/Water pre-heating.
13—Syngas cooling/CO oxidation/Water Gas Shift (WGS). Water boiling.
14—Syngas cooling. Methane ("feed gas") pre-heat/pre-reforming.
15—Flue gas cooling. Anode off-gas ("fuel")/Air pre-heat.
16—Flue gas cooling. Water boiling.
17—Flue gas cooling. Feed pre-heat/pre-reforming.
18—Multi-stage combustion. Multi-stage heating of reactant. Multi-stage reforming.

Significant ones of these functions will be described in more detail later in this specification.

The feed gas is, as shown, subject to stepwise reforming involving:

Three pre-reformers 19 heated by hot syngas in portion 14,
Two pre-reformers 20 heated by hot flue gas in portion 17, and
Nine reformers 21, in reactor portion 18, that are heated indirectly by catalytic combustion of the anode off-gas.

Figure 3:
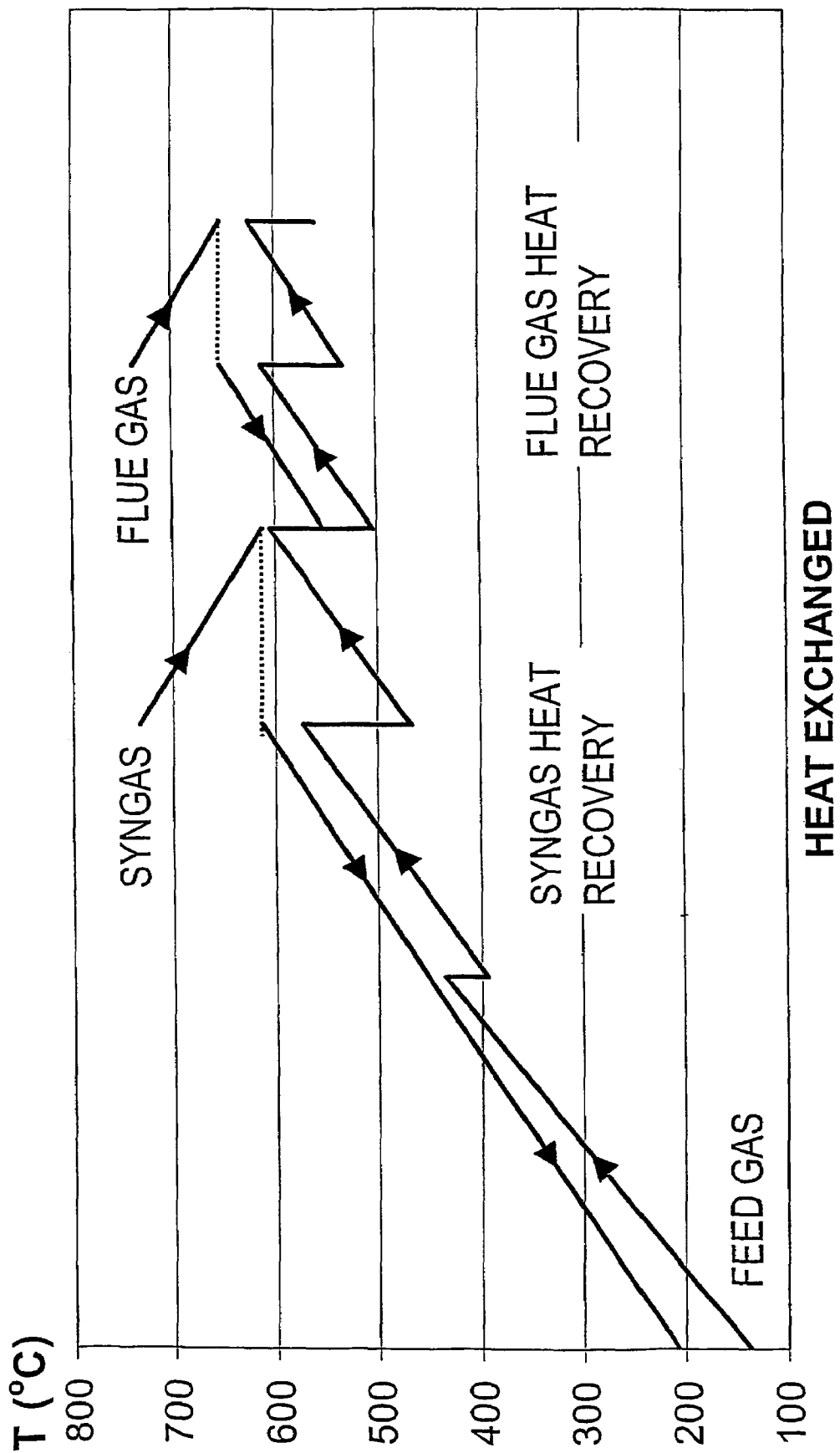
FIG. 3 shows a temperature profile of the pre-reforming stages.
Figure 4:
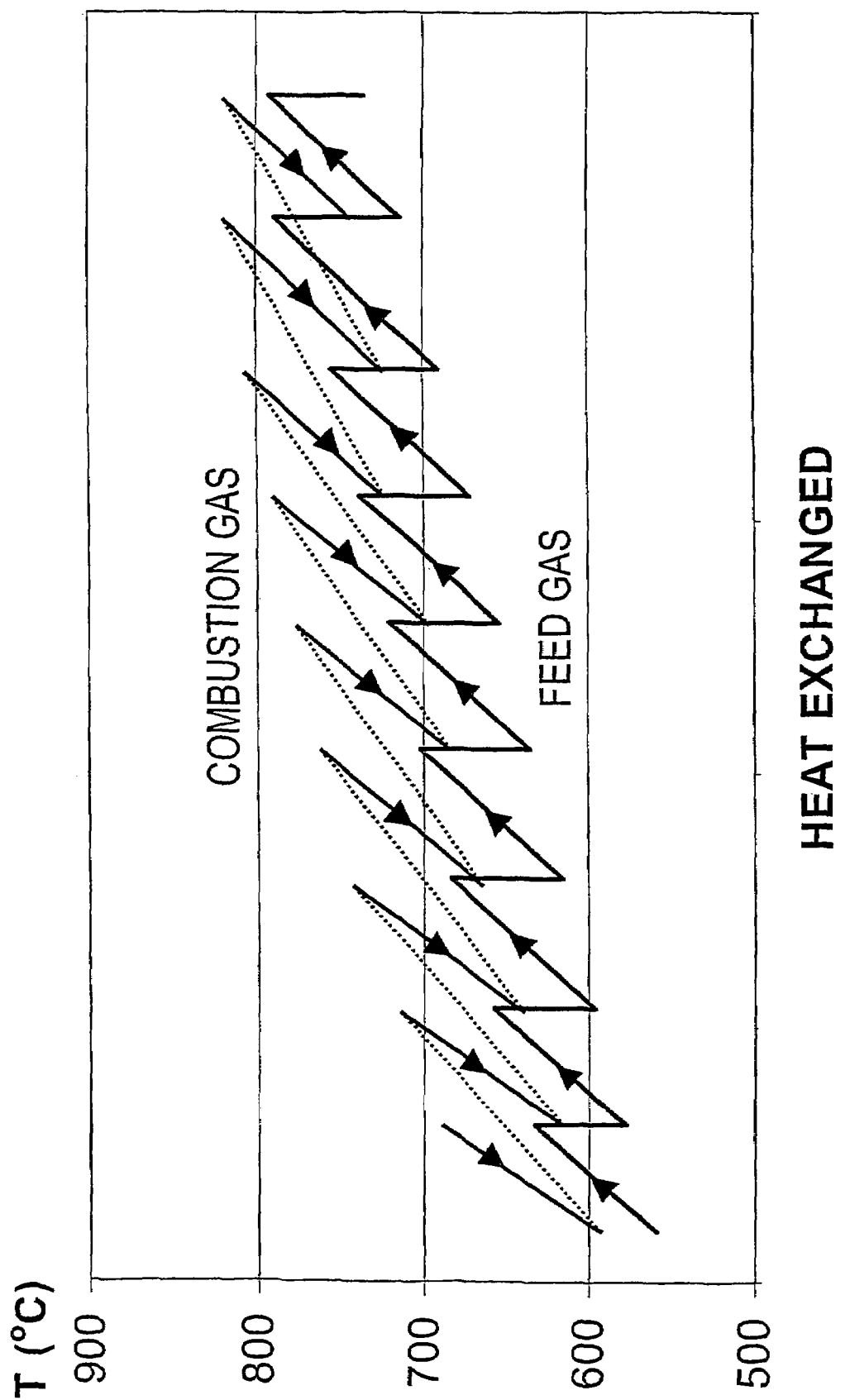
FIG. 4 shows a temperature profile of the reforming stages.
Figure 5:
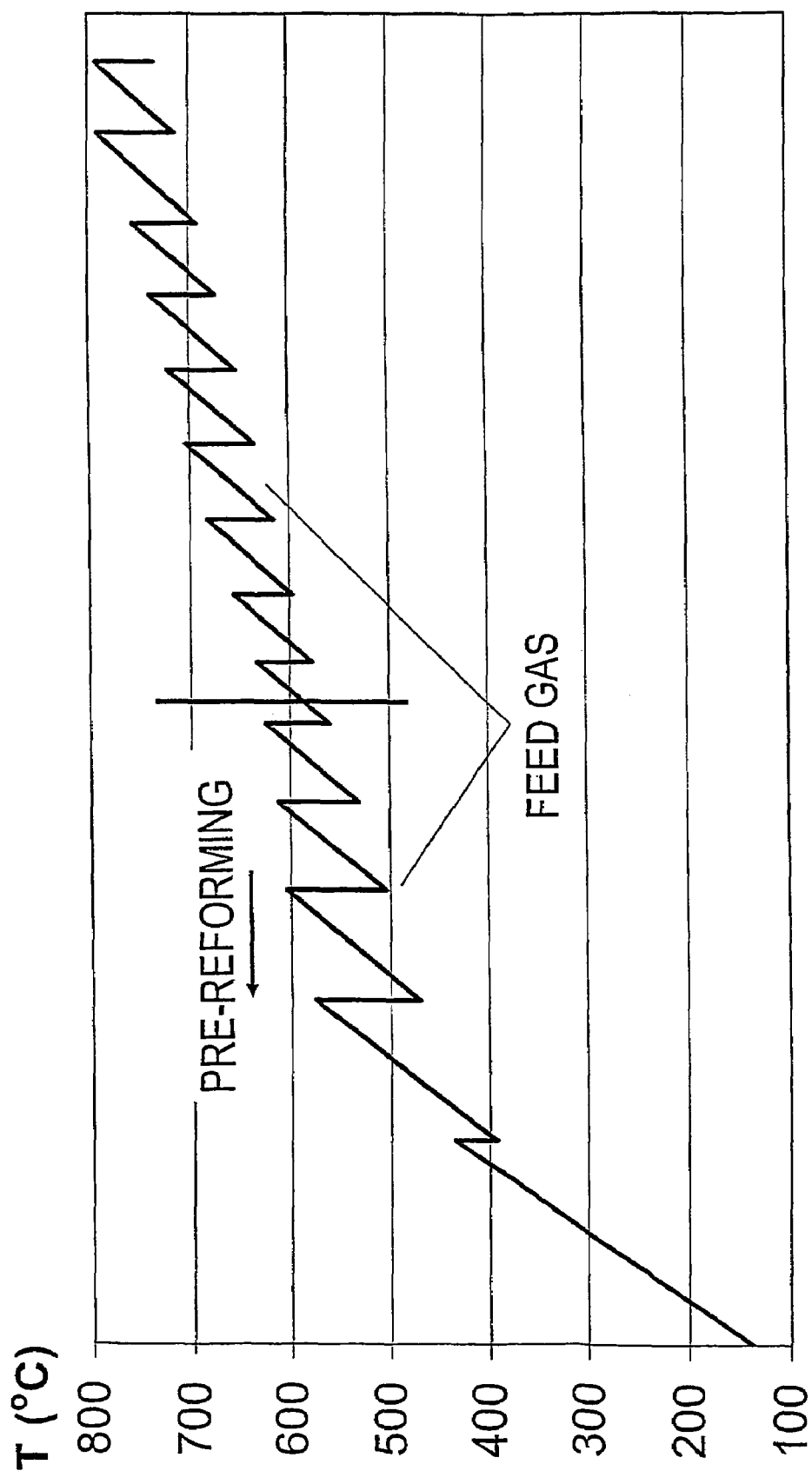
FIG. 5 shows a temperature profile of the combined pre-reforming and reforming stages.

The temperature profiles for the pre-reforming and reforming stages 19/20 and 21 are shown in FIGS. 3 and 4 respectively and the composite temperature profile is shown in FIG. 5. As indicated, the maximum reforming temperature is held below 800 degrees C. because higher temperatures are not essential at intended low operating pressures. Any methane slip will constitute an "inert" at the fuel cell anode and ultimately will usefully be burned in the combustors.

In the relatively low temperature pre-reforming stages higher hydrocarbons are converted and the hydrogen content is increased well below methane cracking temperatures. Above 650 degrees C. carbon formation from methane cracking occurs more quickly than the carbon removal reactions if the methane cracking equilibrium is unfavorable, so high hydrogen levels are required by the time this temperature is reached. The six stages of pre-reforming and reforming that are shown to occur below 650 degrees C. help to ensure that carbon activity remains below unity at temperatures above 650 degrees.

Also, the fuel processor as shown in FIG. 2 integrates features that facilitate passive control (i.e., self regulation) of operation.

The heat exchangers may be sized and configured such that the temperature profile shown in FIG. 5 is substantially maintained even under conditions of substantial turn-down. Only the maximum reformer temperature requires independent control, by controlling the fuel supply rate.

Counter-flow and co-flow heat exchangers are employed. Both pinch up as flow rates fall, without substantially affecting boundary temperatures.

The split, parallel feed of fuel to the catalytic combustors, the air supply to the two stages of selective CO oxidation and the water supply to the heat exchangers are all integrated into the fuel processor.

Water may be supplied at the rate required to maintain the liquid level in the phase separator, from which provision may be made for a net outflow of steam and a small liquid blow-down. The steam ratio remains reasonably constant with capacity as the availability of heat to raise steam varies with the methane throughput.

Reference is now made to FIGS. 2 to 7 and to the functionality of the various portions 12 to 18 of the fuel processor.

Figure 6:
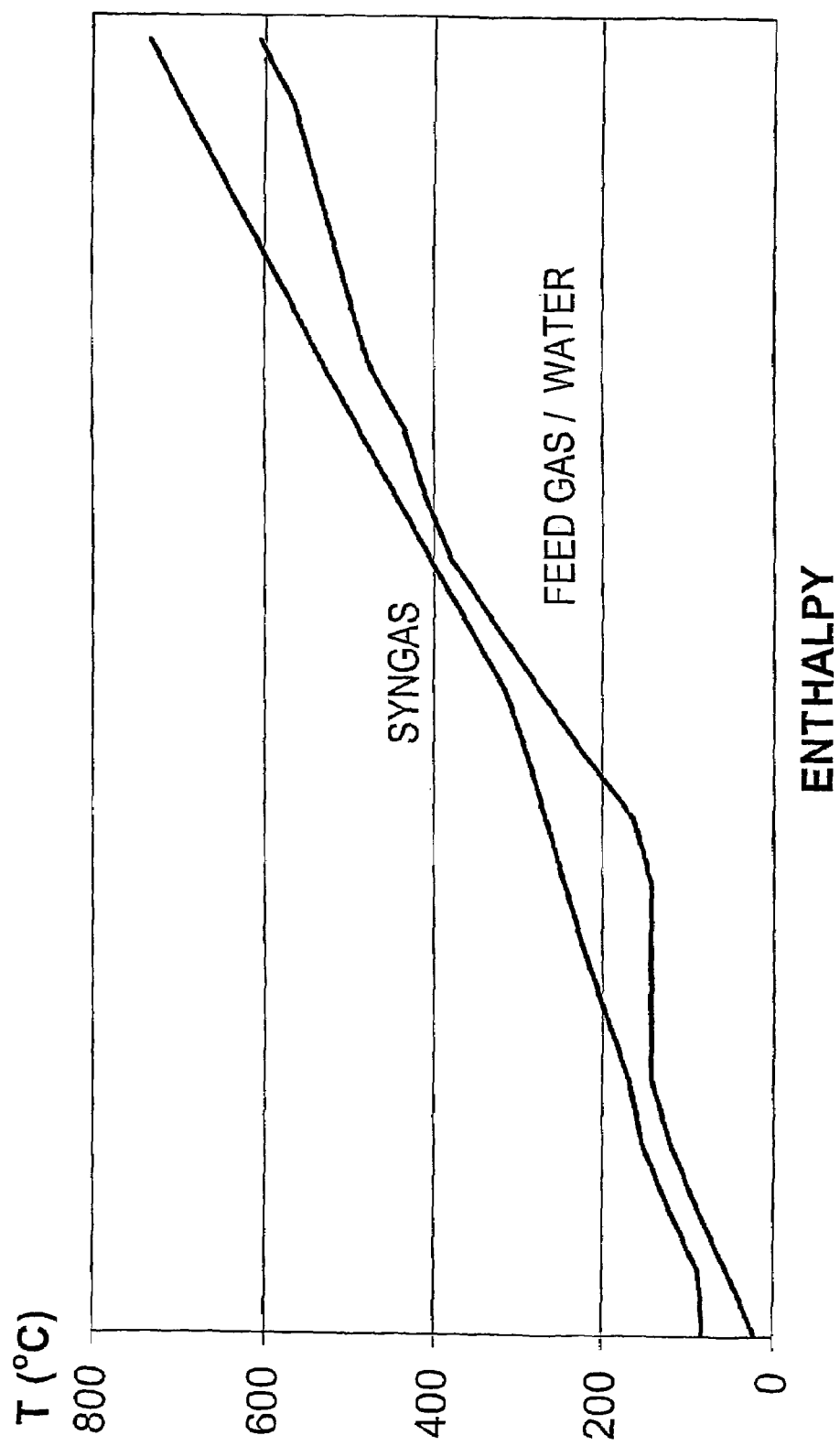
FIG. 6 shows a graph of syngas heat recovery.

In portion 12 a three-stream, counter-flow heat exchanger 22 is employed to preheat the water and methane in the final cooling stage of the syngas, and an internal pinch occurs at the point where water condensation begins on the syngas side. The three-stream heat exchanger permits relatively high effectiveness to be achieved, as shown in FIG. 6, and avoids the need for a controlled split of the syngas stream to preheat the methane and water streams in separate exchangers.

In relation to portion 13, as shown in FIG. 2, it is observed that CO levels should typically be held below 10 ppm for a PEMFC. This requires a selective oxidation (COOX) reaction following the water gas shift. Both of the reactions, as shown, occur in two stages in portion 13.

The heat load for steam raising is relatively high, being about two-thirds of that required from combustion in the reformer stage. Much of the heat recovery from the hot process streams is therefore committed to water boiling, and both the exothermic WGS and COOX reactions can run above the water boiling point, contributing to the steam raising. As indicated water is boiled in a thermosyphon loop in the heat exchangers following these reactions and this provides an opportunity for blow-down, minimizing the quality requirements for make-up water, and avoids dryout on the heat exchange surfaces with high vapor quality.

In portion 15, above the water boiling point, the heat from the hot syngas is used to pre-heat the feed stream. Sufficient heat can be made available to drive the three illustrated stages of preheat, which is favorable for the reasons that: C2+ molecules in the feed are converted to methane at low temperatures, without risk of coking, Hydrogen levels are increased at low temperature, without risk of methane cracking and, as indicated, the high grade heat is used for the purpose of pre-reforming in the three pre-reformer stages 19.

Two heat exchangers 24 provide counter-flow exchange and the third heat exchanger 25 provides co-flow exchange, in order to lock-in a required temperature profile during turndown. The co-flow in the third exchanger is provided to counter the possible danger of overheating the feed stream and cracking methane.

In portion 15 a three-stream heat exchanger 26 is again employed, with the fuel and air being preheated separately to avoid the need for a controlled split of the flue gas. The preheated air is passed serially through the illustrated nine stages of catalytic combustion in portion 18, whilst the preheated fuel is fed to combustion zones 27 in parallel streams in order to limit the temperature rise in each zone.

Most of the steam for the processor is raised in the heat exchanger 23 in portion 16, the heat exchanger operating as a once-through boiler which provides an exit quality below about 70% which avoids the possibility of dry-out.

The two further stages 20 of pre-reforming are provided in portion 17 for the purpose of generating relatively low temperature hydrogen, further protecting against methane cracking in the reformer stages 21 in portion 18. One associated heat exchanger 28 is arranged to provide counter-flow exchange and the other heat exchanger 29 provides for co-flow exchange, in order to lock-in a required temperature profile during turndown, without risk of overheating the feed.

Figure 7:
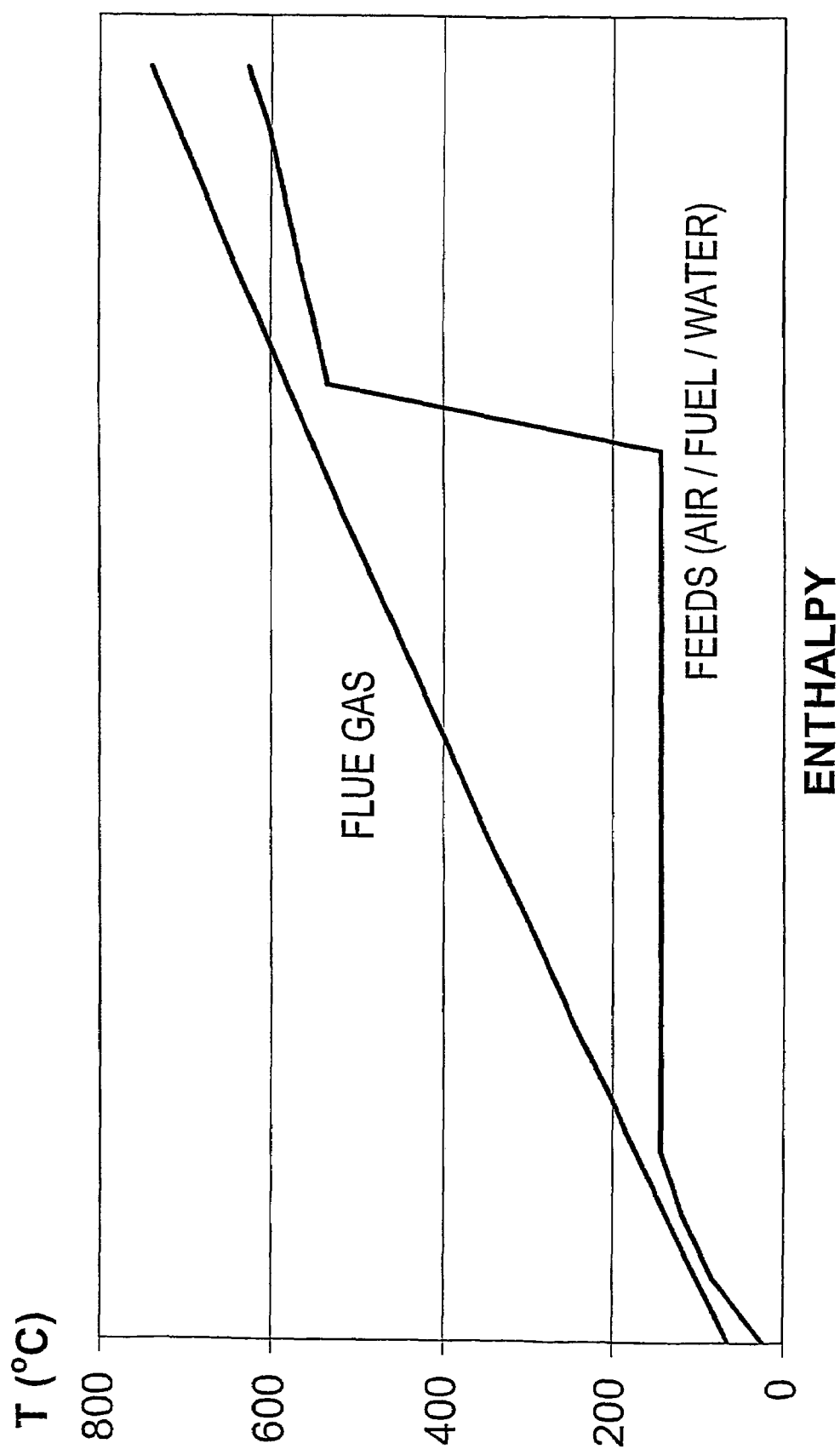
FIG. 7 shows a graph of flue heat recovery.

FIGS. 6 and 7 of the drawings are relevant to the preceding description of the processor portions 13 to 17 in that they show graphically the temperature profiles of the syngas and flue gas heat recovery respectively.

The reformer itself, in portion 18 of the fuel processor consists of the nine stages 21 of reforming reaction which are driven by the nine stages 27 of anode off-gas combustion. The reactions on both sides occur in essentially adiabatic beds, with heat exchangers 30 providing heat exchange between the fluids as they pass between the respective adiabatic beds.

Fluid circuitry within the reformer portion provides for splitting of the anode off-gas into nine parallel streams, as indicated in FIG. 2, and, as will be apparent from plate configurations to be referred to below, further sub-division of the fuel in those streams into numerous parallel streams for intimate mixing into the combustion supporting air prior to combustion at each stage 27.

The ascending temperature profile for the reformer, as shown in FIG. 5, is driven by this circuitry without further active control. As indicated previously, only the maximum reformer temperature requires continuous control through the total fuel supply rate.

Figure 8:
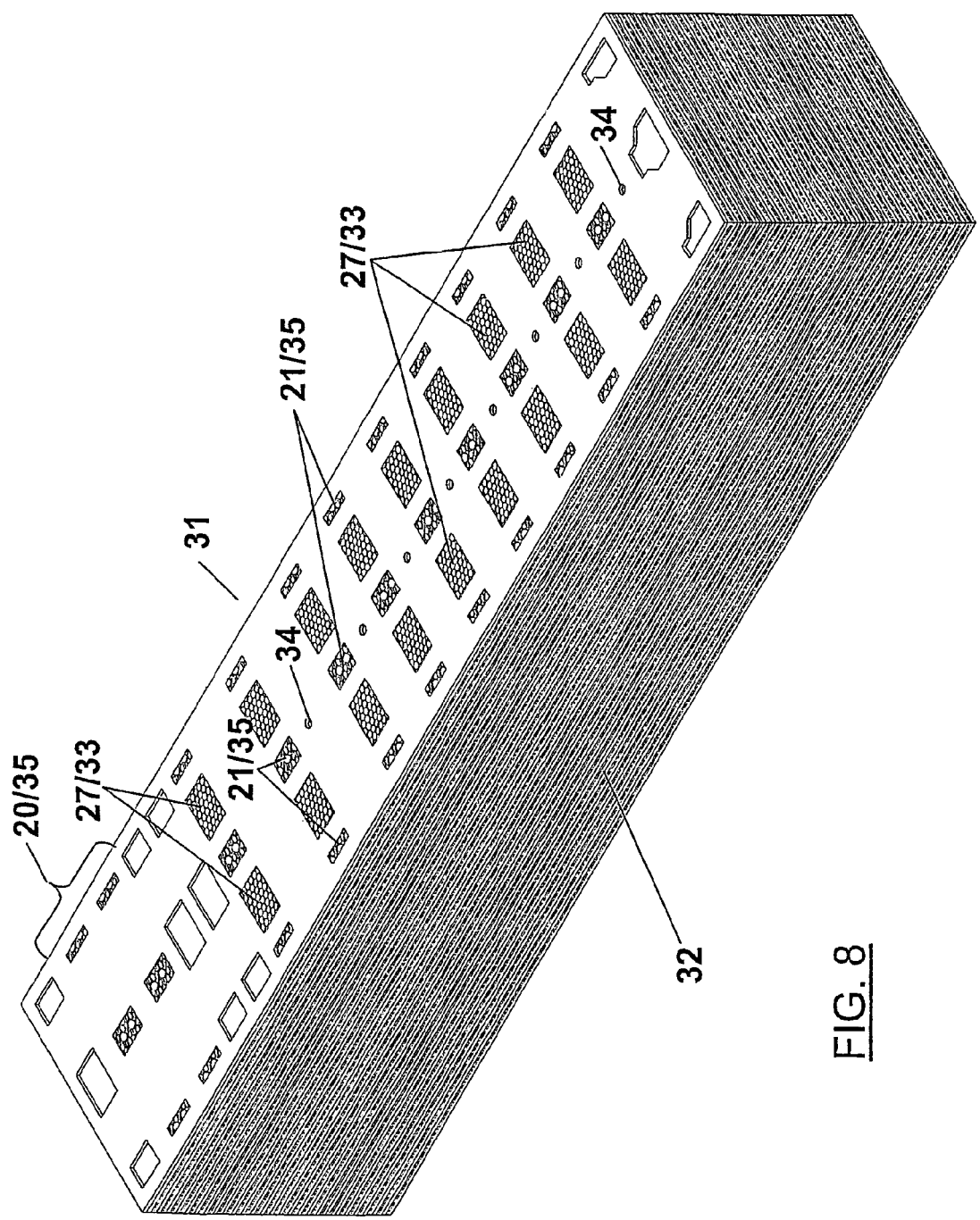
FIG. 8 shows a perspective view of the core of the fuel processor in isolation from associated fluid supply and discharge pipework.

Portions 17 and 18 of the fuel processor as shown diagrammatically in FIG. 2 may be embodied in the core 31 which is shown, also somewhat diagrammatically, in FIG. 8. Associated fluid supply and discharge pipework (as indicated schematically in FIG. 1) are omitted from FIG. 8 and primary features only of the core are illustrated. The features that are omitted, for descriptive convenience, will be understood and readily ascertainable by persons who are familiar with contextual technology.

The core 31 comprises a single stack of diffusion bonded plates 32, the total number of which will be dependent upon the capacity required of the fuel processor in any given application, and the core incorporates two parallel rows of nine reaction zones 33 which, in the case of the above described fuel processor, comprise the combustion zones 27.

The reaction zones 27/33 are fed with a first reactant (i.e., the combustion supporting gas in the case of the fuel processor) by way of end ports (not shown) in the core. Also, the reaction zones 27/33 are fed with a second reactant (i.e., fuel in the case of the fuel processor) by way of inlet ports 34.

The core 31 further incorporates three parallel rows of nine catalyst receiving zones 35 and 35A which, in the case of the fuel processor, comprise the above mentioned pre-reforming and reforming regions 20 and 21 of portions 17 and 18 of the fuel processor. The catalyst receiving zones are fed with a third reactant (i.e., the methane and steam in the case of the fuel processor) by way of inlet and outlet ports in the top and/or bottom of the core as viewed in FIG. 8.

Figure 9:
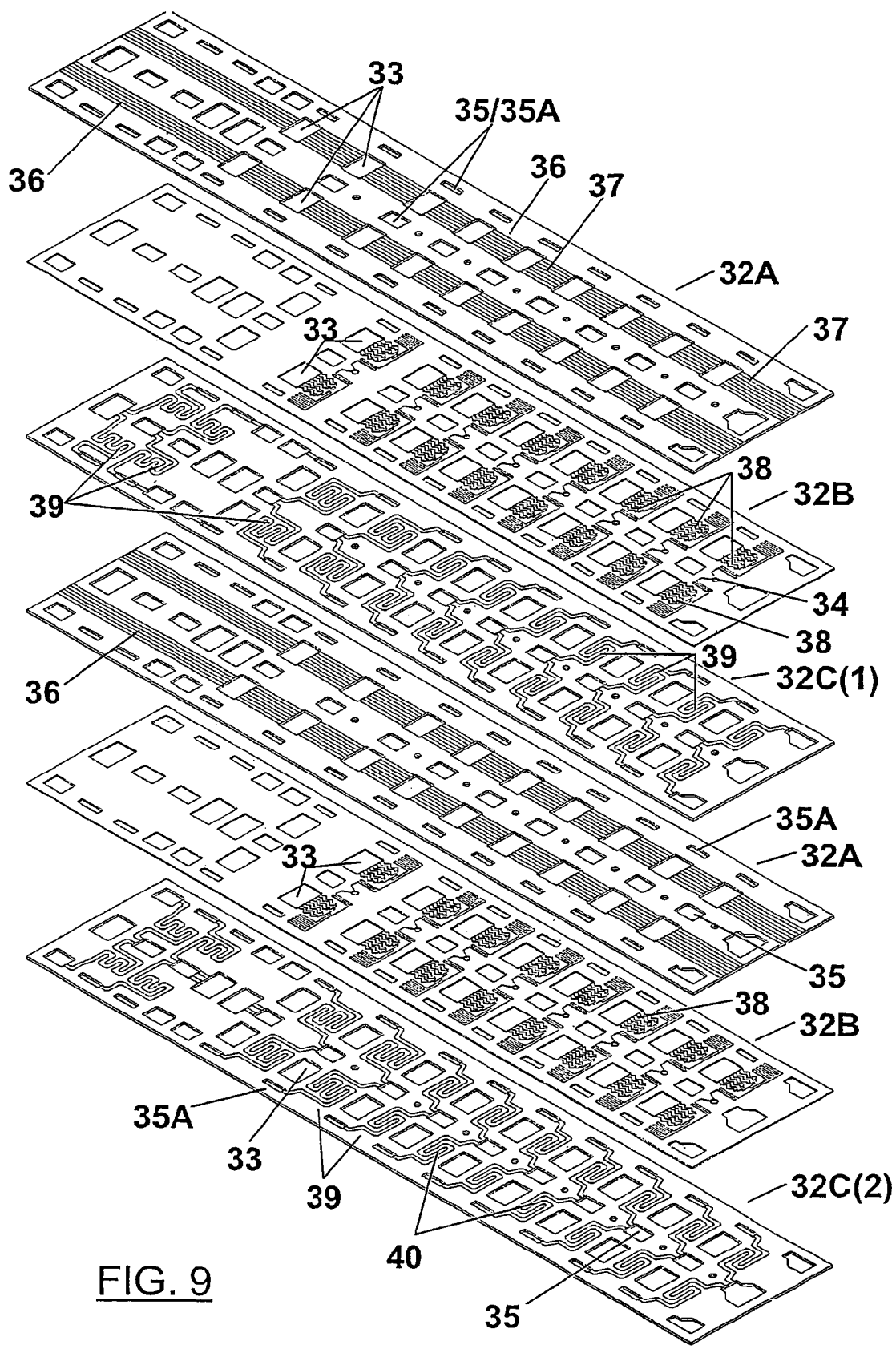
FIG. 9 shows, in superpositioned relationship, a group of six metal plates that are stacked and diffusion bonded with further such groups to form the core.

The plates 32 are all formed with generally rectangular apertures, various ones of which align to form the reaction zones 33 and the catalyst receiving zones 35. The plates are stacked in repeating groups of six plates, one of which groups is shown in FIG. 9 and comprises, from the top down:

Plate 32A—which carries the first reactant (i.e., the combustion supporting gas).
Plate 32B—which carries the second reactant (i.e., the fuel).
Plate 32C(1)—which carries a first stream of the third reactant (i.e., syngas 1).
Plate 32A—which carries the first reactant (i.e., the combustion supporting gas).
Plate 32B—which carries the second reactant (i.e., the fuel).
Plate 32C(2)—which carries a second stream of the third reactant
(i.e., syngas 2).

All of the plates are formed from a heat resisting alloy such as stainless steel and all plates typically have the dimensions 600 mm by 100 mm. The plates 32A, C(1) and C(2) have a thickness of 1.6 mm and the plates 32B have a thickness of 0.7 mm.

A first channel arrangement 36 is provided in the plates 32A for transporting the first reactant to and between the apertures 33 that define the reaction zones 27. The channel arrangement extends linearly between supply and discharge ports that, in use of the processor, are located at the ends of the core 31. Portions 37 of the channel arrangement that extend between and, in some cases beyond, adjacent pairs of the apertures 33 function, in use, as heat exchange channels.

A second channel arrangement 38 is provided in the plates 32B for delivering the second reactant in parallel streams to each of the reaction zones 33 from the supply ports 34. The second channel arrangement incorporates a large number of feed branches that communicate with the reaction zones 33 to facilitate intimate mixing of the first and second reactants (i.e., the air and combustible gas in the case of a fuel processor) in the reaction zones 33.

A third channel arrangement 39 is provided in each of the plates 32C(1) and 32C(2) for transporting the third reactant in parallel streams to and between the catalyst receiving zones 35 and 35A in the respective plates. Serpentine shaped portions 40 of the third channel arrangement are positioned to locate in heat exchange proximity to the heat exchange portions 37 of the first channel arrangement 36 in the plates 32A with which the plates 32C(1) and C(2) have surface contact.

The various channels in the plates 32A and 32C(1) and C(2) are semi-circular in cross-section and have a radial depth of 1.0 mm, and those in plates 32B have a radial depth of 0.4 mm.

As previously described, the plates 32 are stacked and diffusion bonded in face-to-face relationship; that is, with the (front) channelled face of each plate in contact with the (rear) un-channelled face of its adjacent plate.

Variations and modifications may be made in respect of the fuel processor and its component parts as above described without departing from the scope of the invention as defined in the appended claims. For example, the order of plate stacking, the positioning of the various reaction zones and the dispositions and configurations of the various channel arrangements may be changed extensively from those that have been described and illustrated.

The invention claimed is:

1. A chemical reactor comprising:
    a) a core including at least one stack of metal plates bonded in face-to-face relationship,
    b) a plurality of reaction zones located within the core,
    c) a plurality of catalyst receiving zones located within the core,
    d) a first channel arrangement provided in at least some of the plates for transporting a first reactant to and between the reaction zones, portions of the first channel arrangement that interconnect the reaction zones being formed over at least a portion of their length as heat exchange channels,
    e) a second channel arrangement provided in at least some of the plates and arranged to deliver a second reactant to each of the reaction zones, and
    f) a third channel arrangement provided in at least some of the plates for transporting a third reactant to and between the catalyst receiving zones, portions of the third channel arrangement that interconnect the catalyst receiving zones being formed over at least a portion of their length as heat exchange channels that are positioned in heat exchange proximity to the heat exchange channels of the first channel arrangement so that in use, heat exchange of the chemical reactor takes place substantially between the heat exchange channels of the first channel arrangement and the heat exchange channels of the third channel arrangement.

2. The chemical reactor as claimed in claim 1 wherein the core comprises a single stack of metal plates which are diffusion bonded in face-to-face contacting relationship.

3. The chemical reactor as claimed in claim 2 wherein each of the reaction zones is defined by aligned apertures in adjacent plates of the stack.

4. The chemical reactor as claimed in claim 2 wherein each of the catalyst receiving zones is defined by aligned apertures in adjacent plates of the stack.

5. The chemical reactor as claimed in claim 2 wherein the reaction zones are arranged to constitute combustion zones.

6. The chemical reactor as claimed in claim 2 wherein the reaction zones are charged with a catalyst that is selected to provide for catalytic combustion of the first and second reactants.

7. The chemical reactor as claimed in claim 2 wherein the plates are stacked in repeating groups of six superimposed plates, with the first and fourth plates (in descending order) being formed with the first channel arrangement for transporting the first reactant to and between the reaction zones, the second and fifth plates being formed with the second channel arrangement for delivering the second reactant to the reaction zones and the third and sixth plates being formed with the third channel arrangement for transporting the third reactant to and between the catalyst receiving zones.

8. The chemical reactor as claimed in claim 7 wherein the second and fifth plates have a thickness that is less than that of the other plates in each group.

9. The chemical reactor as claimed in claim 7 wherein channel elements that form the second channel arrangement have a cross-sectional area that is smaller than that of channel elements that form the first and third channel arrangements.

10. The chemical reactor as claimed in claim 1 wherein the reaction zones are arrayed in two parallel rows and the first channel arrangement extends linearly between the reaction zones.

11. The chemical reactor as claimed in claim 10 wherein the catalyst receiving zones are arrayed in three parallel rows, one of which is located between the rows of reaction zones and the other two of which are located outside of the rows of reaction zones.

12. The chemical reactor as claimed in claim 1 when in the form of a reformer that is suitable for use in association with a fuel cell.

13. The chemical reactor as claimed in claim 2 when embodied in a fuel processor having a reformer stage that incorporates the reaction zones, when in the form of conduction zones, and the catalyst receiving zones.

14. The chemical reactor as claimed in claim 2 when embodied in a fuel processor for use in association with a proton exchange membrane fuel cell, the fuel processor having a reformer stage that incorporates the reaction zones, when in the form of conduction zones, and the catalyst receiving zones.

15. The chemical reactor as claimed in claim 13 wherein the fuel processor, of which the reactor forms a part, incorporates at least one pre-reformer stage incorporating at least one of the catalyst receiving zones.

16. The chemical reactor as claimed in claim 15 wherein the fuel processor incorporates at least one pre-reformer that is arranged to be heated by a hot syngas.

17. The chemical reactor as claimed in claim 15 wherein the fuel processor incorporates at least one pre-reformer that is arranged to be heated by hot flue gas that is, in use, directed through a portion of the third channel arrangement.

18. A method of effecting a chemical reaction in a chemical reactor as claimed in any one of the preceding claims and which comprises the steps of:

directing a first reactant into and serially through the reaction zones in the chemical reactor by way of the first channel arrangement, directing a second reactant in parallel feeds into the reaction zones by way of the second channel arrangement, the second reactant being selected to react exothermically with the first reactant in the respective reaction zones, and concurrently directing a third reactant into and serially through a catalyst contained in the catalyst receiving zones by way of the third channel arrangement and, in so doing, exposing the reactant to heat from the product of the exothermic reaction in its passage through the heat exchange channels of the first channel arrangement.

* * * * *